United States Patent [19]
Ohnishi et al.

[11] Patent Number: 5,310,832
[45] Date of Patent: May 10, 1994

[54] PROCESS FOR PRODUCING VINYL CHLORIDE-BASED POLYMER

[75] Inventors: Shuji Ohnishi, Lake Jackson, Tex.; Tadashi Amano, Kamisu, Japan

[73] Assignee: Shin-Etsu Chemical Co., Ltd., Tokyo, Japan

[21] Appl. No.: 63,610

[22] Filed: May 19, 1993

[30] Foreign Application Priority Data

May 19, 1992 [JP] Japan .................................. 4-151505

[51] Int. Cl.$^5$ ........................... C08F 2/18; C08F 14/06
[52] U.S. Cl. ......................................... 526/86; 526/88; 526/344.2
[58] Field of Search ............... 526/82, 344.2, 86, 88

[56] References Cited

U.S. PATENT DOCUMENTS

| | | | |
|---|---|---|---|
| 3,801,560 | 4/1974 | Roll et al. ........................ | 526/344.2 |
| 3,871,830 | 3/1975 | Chauvier ......................... | 526/344.2 |
| 3,980,628 | 9/1976 | Sorenson et al. .................. | 526/86 |
| 4,163,040 | 7/1979 | Van den Bossche ................. | 526/86 |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A process for producing a vinyl chloride-based polymer in which an aqueous suspension of a vinyl chloride-based monomeric material placed in a polymerization vessel equipped with an agitating element is subjected to suspension polymerization by introducing a polymerization initiator to the aqueous suspension at a position located inside the diameter of the agitating element being rotated. By this process it is possible to prevent totally the deposition of polymer scale on the inside wall of the polymerization vessel, particularly in the vicinity of a gas-liquid interface. Therefore, troubles arising from polymer scale formation and labor needed for removing such polymer scale are obviated, and a vinyl chloride-based polymer of high quality can be produced efficiently.

6 Claims, 2 Drawing Sheets

5,310,832

PROCESS FOR PRODUCING VINYL CHLORIDE-BASED POLYMER

BACKGROUND OF THE INVENTION

1. Field of the Invention

The present invention relates to a process for producing a vinyl chloride homopolymer or a vinyl chloride-based copolymer (hereinafter generically referred to as "vinyl chloride-based polymer"). More specifically, the invention relates to a process by which a vinyl chloride-based polymer of high quality can be produced by suspension polymerization of vinyl chloride monomer or a vinyl chloride-based monomeric mixture (hereinafter generically referred to as "vinyl chloride-based monomeric material") in a polymerization vessel, with high productivity while preventing the formation of polymer scale in the polymerization vessel.

2. Description of the Prior Art

Heretofore, suspension polymerization of a vinyl chloride-based monomeric material has been carried out by a process in which water, the vinyl chloride-based monomeric material, a polymerization initiator, a dispersant and, optionally, other various additives as required, are placed into a polymerization vessel equipped with a jacket, an agitator and a reflux condenser, then hot water is passed through the jacket to heat the reaction system to a predetermined temperature, and thereafter cooling water is passed through the jacket and reflux condenser to remove the heat of polymerization, thereby controlling the temperature of the reaction system to a predetermined temperature.

With the recent trend toward use of larger polymerization vessels and rationalization of production systems, however, various techniques for carrying out polymerization have come to be employed, such as, for example, feeding water at a raised temperature (so-called "hot charge") or automatic feeding of a polymerization initiator by use of a metering high-pressure pump. Consequently, where a polymerization initiator with high activity is used, it is necessary to introduce the initiator into the polymerization vessel after feeding of the monomeric material but before the temperature is raised. In such a situation, the polymerization initiator introduced to the surface of an aqueous mixture containing the monomeric material drifts across a gas-liquid interface portion and the surface of a liquid-phase portion before gradually diffusing into and throughout the bulk of the liquid phase. Depending on the position of introducing the polymerization initiator, therefore, polymer scale deposition in the gas-liquid interface portion can increase. Besides, where an easily foaming dispersant is used, formation of a foamed polymer can occur. Especially where the introducing position of the polymerization initiator is in the vicinity of the wall surface of the polymerization vessel, block form polymer scale can grow on the downstream side with respect to an agitated flow direction, resulting in that a large mass of polymer scale may peel off, to produce a serious trouble such as clogging of an open piping.

Due to the above difficulties, the prior art processes have the drawbacks of an increased idle time, associated with polymer scale removal or the like, and incapability to maintain good polymer quality, because of fish-eye formation or the like.

SUMMARY OF THE INVENTION

It is accordingly an object of the present invention to provide a process for producing a vinyl chloride-based polymer whereby a vinyl chloride-based polymer having high quality with few fish-eyes can be produced with high productivity while preventing the deposition of polymer scale on the inside wall of a polymerization vessel.

According to the present invention, there is provided a process for producing a vinyl chloride-based polymer by suspension polymerization of vinyl chloride or a vinyl chloride-based monomeric mixture in an aqueous medium in a polymerization vessel equipped with an agitating element, comprising the step of:

introducing a polymerization initiator into an aqueous medium containing the vinyl chloride or the monomeric mixture and flowing under agitation in the polymerization vessel, wherein said polymerization initiator is introduced onto the surface of the aqueous medium through a nozzle disposed in a gas-phase zone in said polymerization vessel, the introduction being made at a position located inside the diameter of said agitating element being rotated.

According to the present invention, it is possible to prevent totally the deposition of polymer scale on the inside wall of the polymerization vessel, particularly in the vicinity of a gas-liquid interface. Therefore, troubles arising from polymer scale formation and labor needed for removing such polymer scale are obviated, and a vinyl chloride-based polymer of high quality can be produced efficiently.

DETAILED DESCRIPTION OF THE INVENTION

In general, where a polymerization initiator is introduced into an aqueous medium containing a monomeric material and flowing under agitation, the polymerization initiator floats on the surface of the liquid phase before being gradually engulfed into a central area of an agitating element and diffusing into and throughout the liquid phase. If the position of introducing the polymerization initiator is near the wall surface of the polymerization vessel, the initiator remains floating on the liquid surface for a relatively long time. In such a case, a liquid portion with a high initiator concentration makes contact with the wall surface of the polymerization vessel, resulting in increased formation of polymer scale. According to the present invention, on the other hand, the position of introducing the polymerization initiator is located inside the diameter of the agitating element. Under this condition, the polymerization initiator is swiftly engulfed in the central area of the agitating element, without remaining floating on the surface of the aqueous suspension, and diffuses into and throughout the suspension. As a result, the deposition of polymer scale on the inside wall of the polymerization vessel, particularly in the vicinity of the gas-liquid interface, can be totally prevented.

The present invention will now be described with reference to an embodiment shown in the attached drawings.

Figure 1:
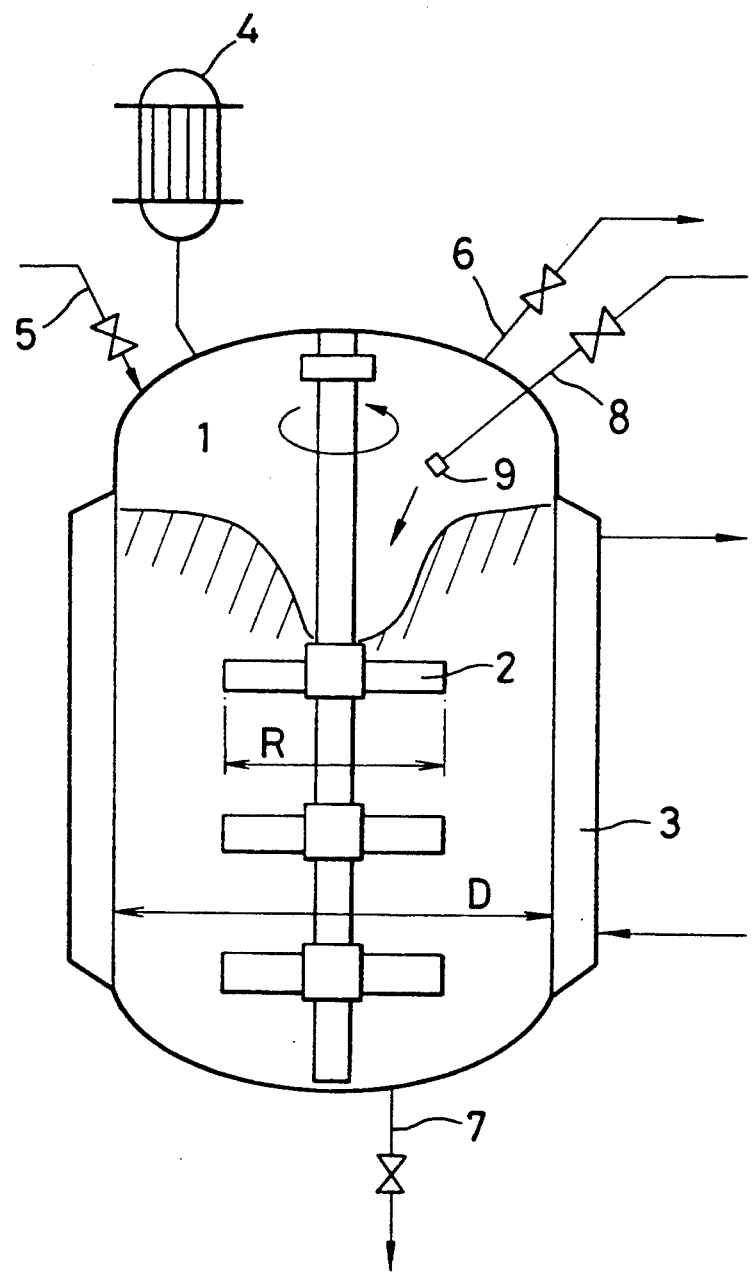
FIG. 1 illustrates the total construction of a polymerization apparatus used for carrying out preferably the process according to the present invention.
Figure 2:
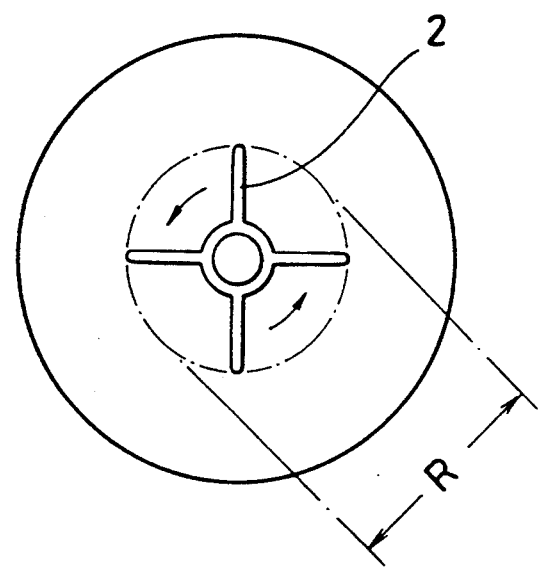
FIG. 2 is a horizontal sectional view showing the apparatus of FIG. 1.

FIG. 1 illustrates schematically the total construction of a polymerization apparatus used for carrying out preferably the process according to the present invention, and FIG. 2 is a horizontal sectional view of the apparatus. In the figures, there are shown a substantially cylindrical polymerization vessel 1 ( with inside diameter D), agitating elements 2 (with diameter R), a jacket 3 for heating or cooling, a reflux condenser 4, a feed piping 5, a piping 6 for recovery of monomeric material, a drawing-out piping 7, a piping 8 for introduction of polymerization initiator, and a nozzle 9.

In the polymerization apparatus as above, a monomeric material such as vinyl chloride, an aqueous medium and additives such as dispersant are fed through the feed piping 5 into the polymerization vessel 1. Further, the polymerization initiator is added under rotation of the agitating elements 2, and the resulting mixture in the polymerization vessel 1 is heated to a predetermined temperature, whereby polymerization is started. The resulting polymer slurry is taken out through the piping 7, and unreacted monomeric material is recovered through the piping 6.

As has been described above, according to the present invention, the polymerization initiator is introduced to the inside of the diameter R of the agitating elements 2 being rotated (that is, the initiator is introduced to the inside of the circle with diameter R in FIG. 2). In introducing the polymerization initiator, it is preferable to feed the initiator directly into the aqueous suspension containing the monomeric material, so as to prevent the initiator from making contact with the shaft for the agitating elements 2 or the like.

The method of introducing the polymerization initiator is not particularly limited, provided the initiator is introduced to the position as above-described. Ordinarily, however, the feed piping 8 is extended to a predetermined position in the inside of the polymerization vessel 1, a nozzle 9 is provided at the tip of the piping 8, and the polymerization initiator is introduced under pressure by a metering high-pressure pump. Besides, the nozzle 9 and the tip of the piping 8 are disposed so as not to be dipped in the aqueous suspension.

The polymerization initiator may be introduced with various timings. For instance, after the aqueous medium, dispersant and additives are fed into the polymerization vessel, the monomeric material is fed into the polymerization vessel, and then temperature is raised while introducing the polymerization initiator. Alternatively, temperature may be raised while feeding these components into the polymerization vessel simultaneously and in parallel. Although the polymerization initiator can be introduced in an as-is state into the polymerization vessel, it is preferable to introduce the initiator as an emulsion or dispersion in a dispersant. In that case, the concentration of the polymerization initiator in the emulsion or dispersion is preferably from 10 to 80% by weight.

As the agitating element 2 in the above-described polymerization apparatus, those agitating elements which are of paddle, Pfaudler, Brumagin, propeller, turbine or the like types may be used, either singly or, if necessary, in combination with a baffle in the form of flat plate, cylinder, hairpin coil or the like. The diameter of the agitating element 2 is not particularly limited. Ordinarily, however, the diameter R of the agitating element 2 is in such a range as to satisfy the relationship of $0.2 \leq R/D \leq 0.8$, wherein D is the inside diameter of the polymerization vessel. Besides, it is preferable to introduce the polymerization initiator while the agitating element 2 is rotated at an outer-end circumferential velocity of from 5 to 15 m/s. If the polymerization initiator is introduced while the circumferential velocity is less than 5 m/s, the initiator is dispersed in the reaction mixture nonuniformly, leading to the formation of an increased number of fish-eyes. If the introduction is carried out when the circumferential velocity is above 15 m/s, on the other hand, droplets in the reaction mixture become unstable and may be broken, resulting in that the polymer product obtained has a broadened particle size distribution.

As the vinyl chloride-based monomeric material in the process of the present invention, not only vinyl chloride monomer but also mixtures of vinyl chloride (as a main constituent) and other vinyl monomer or monomers copolymerizable therewith (vinyl chloride content being ordinarily 50% by weight or above) may be used. The comonomers which are copolymerizable with vinyl chloride include, for example, α-olefins such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like; acrylic acid or esters thereof such as acrylic acid, methyl acrylate, ethyl acrylate and the like; methacrylic acid or esters thereof such as methacrylic acid, methyl methacrylate and the like; maleic acid or esters thereof; vinyl esters such as vinyl acetate, vinyl propionate and the like; vinyl ethers such as lauryl vinyl ether, isobutyl vinyl ether and the like; maleic acid anhydride; acrylonitrile; styrene; vinylidene chloride and the like. These comonomers may be used either singly or in combination of two or more, along with the vinyl chloride monomer.

As the polymerization initiator for use in the process according to the present invention, those initiators conventionally used for polymerization of vinyl chloride or vinyl chloride-based monomeric mixtures can be used. Examples of the usable initiators include percarbonate compounds such as diisopropyl peroxydicarbonate, di-2-ethylhexyl peroxydicarbonate, diethoxyethyl peroxydicarbonate and the like; per-ester compounds such as t-butyl peroxyneodecanate, t-butyl peroxypivalate, t-hexyl peroxypivalate, α-cumyl peroxyneodecanate, 2,4,4-trimethylpentyl-2-peroxy-2-neodecanate and the like; peroxides such as acetylcyclohexylsulfonyl peroxide, 2,4,4-trimethylpentyl 2-peroxyphenoxyacetate, 3,5,5-trimethylhexanoyl peroxide, lauroyl peroxide and the like; azo compounds such as azobis-2,4-dimethylvaleronitrile, azobis(4-methoxy-2,4-dimethylvaleronitrile), and the like. These can be used either singly or in combination of two or more.

Along with the above polymerization initiator, furthermore, water-soluble catalysts can be jointly used. The water-soluble catalysts jointly usable include, for example, potassium persulfate, ammonium persulfate, hydrogen peroxide, cumene hydroperoxide and the like, and these may be used either singly or in combination of two or more.

The polymerization initiators are preferably used in an amount of from 0.01 to 0.3 parts by weight per 100 parts by weight of the total charge of vinyl chloride-based monomeric material.

To the polymerization system, if necessary, polymerization regulator, chain transfer agent, pH adjustor, gelation-improving agent, antistatic agent, cross-linking agent, stabilizer, filler, antioxidant, buffering agent, scale preventive agent and the like conventionally used suitably for polymerization of vinyl chloride-based monomeric mixtures can be added as desired.

EXAMPLES

Example 1

A 2.1-m$^3$ stainless-steel polymerization vessel (inside diameter: 1.05 m) equipped with a jacket, baffles and an agitator (having three sets of paddles with a paddle set diameter of 0.52 m) was charged with 840 kg of deionized water of 50° C., 240 g of a partially saponified polyvinyl alcohol, and 160 g of cellulose ether, in the form of aqueous solution. After degassing the polymerization vessel to a pressure of 50 mmHg, 670 kg of vinyl chloride monomer was placed into the polymerization vessel. While agitating the mixture in the polymerization vessel by rotating the agitator at an outer-end circumferential velocity of 5.5 m/s, 760 g of a 70 wt. % dispersion of di-2-ethylhexyl peroxydicarbonate was pumped into the polymerization vessel. The position of introduction of the dispersion was at a distance of 0.28 m inward from the inside wall of the polymerization vessel. Simultaneously, hot water was passed through the jacket to heat the reaction mixture to 56° C., and reaction was continued.

When the pressure inside the polymerization vessel was lowered to 6.5 kg/cm$^2$G, unreacted monomer was recovered, and the polymerizate was taken out of the polymerization vessel as a slurry. After washing the interior of the polymerization vessel with water, the same procedure as above was repeated, and the slurry drawn out of the polymerization vessel was dehydrated and dried, to yield a polymer. The polymer thus obtained was subjected to measurements to determine bulk specific gravity, particle size distribution, plasticizer absorption and fish-eyes, according to the methods described below. The results are set forth in Table 1.

Bulk specific gravity:
Measured according to JIS K 6721.
Particle size distribution:
Using 60-, 80-, 100-, 150- and 200-mesh sieves according to JIS Z 8801, the polymer particles were sifted, and the amount of polymer particles (% by weight) having passed through each sieve was measured.
Plasticizer absorption:
Glass fibers were packed in the bottom of an aluminum alloy vessel 25 mm in inside diameter and 85 mm in depth, and 10 g of the sample resin was placed into the vessel. Then, 15 cc of dioctyl phthalate (hereinafter referred to as "DOP") was added, and left to stand for 30 minutes so that the DOP permeated the resin sufficiently. Excess portion of the DOP was centrifugally removed under an acceleration of 1500 G, and the amount of DOP absorbed in the resin was determined in parts by weight per 100 parts by weight of the resin.
Fish-eye:
Twenty-five (25) g of a mixture prepared by mixing 100 parts by weight of the vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded by 6-inch kneading rolls at 140° C. for 5 minutes, and formed into a sheet 15 cm in width and 0.2 mm in thickness. For the sheet thus obtained, the number of transparent particles per 100 cm$^2$ area was counted. The count thus obtained was used as the number of fish-eyes.

Comparative Example 1

Polymerization was carried out in the same manner as in Example 1, except that the position of introducing the polymerization initiator was set at a distance of 0.13 m inward from the inside wall of the polymerization vessel. The polymer thus obtained was subjected to the same measurements as in Example 1. The results are shown in Table 1.

TABLE 1

|  | Example 1 | Comparative Example 1 |
|---|---|---|
| Quality of Polymer: |  |  |
| Bulk specific gravity | 0.525 | 0.510 |
| Particle size distribution (pass (wt. %)) |  |  |
| 60 mesh | 100 | 99.5 |
| 80 mesh | 63.4 | 62.3 |
| 100 mesh | 40.8 | 39.4 |
| 150 mesh | 24.6 | 21.0 |
| 200 mesh | 0.9 | 1.0 |
| Plasticizer absorption | 24.3 | 22.6 |
| Fish-eye | 1 | 150 |
| Deposition of polymer scale | Only a little scale deposition in gas-liquid interface area. | Scale deposition along entire circumference of gas-liquid interface area. Scale growth in block form on wall surface at 30 cm downstream from introduction position of initiator. |

We claim:
1. A process for producing a vinyl chloride-based polymer by suspension polymerization of vinyl chloride or a vinyl chloride-based monomeric mixture in an aqueous medium in a polymerization vessel equipped with an agitator comprising a centrally located shaft extended downward from the top of said vessel and an agitating element attached to said shaft, comprising the steps of:
   introducing a polymerization initiator into an aqueous medium containing the vinyl chloride or the monomeric mixture and flowing under agitation in the polymerization vessel,
   wherein said polymerization initiator is introduced onto the surface of the aqueous medium through a nozzle disposed in a gas-phase zone in said polymerization vessel, the introduction being made at a position located inside the diameter of said agitating element being rotated.
2. The process according to claim 1, wherein the introduction of the polymerization initiator is made while the circumferential velocity of an outer end of said agitating element is in the range from 5 to 15 m/sec.
3. The process according to claim 1, wherein said agitating element is selected such that the relationship of $0.2 \leq R/D \leq 0.8$, wherein R is the diameter of the agitating element and D is the inside diameter of said polymerization vessel, is met.
4. The process of claim 1, wherein said vinyl chloride-based monomeric mixture is a mixture of vinyl chloride and a monomer selected from the group con- sisting of ethylene, propylene, 1-butene, 1-pentene, 1-hexene, 1-heptene, 1-octene, 1-nonene, 1-decene, 1-undecene, 1-dodecene, 1-tridecene, 1-tetradecene, acrylic acid methyl acrylate, ethyl acrylate, methacrylic acid, methylmethacrylate, maleic acid maleic acid ester, vinyl acetate, vinyl propionate, lauryl vinyl ether, isobutyl vinyl ether, maleic acid anhydride, acrylonitrile, styrene, vinylidene chloride and a mixture thereof.

5. The process of claim 1, wherein said polymerization initiator is selected from the group consisting of diisopropyl peroxydicarbonate, di2-ethylhexyl peroxydicarbonate, diethoxyethyl peroxydicarbonate, t-butyl peroxyneodecanate, t-butyl peroxypivalate, t-hexyl peroxypivalate, α-cumyl peroxyneodecanate, 2,4,4-trimethylpentyl-2-peroxy-2-neodecanate, actylcyclohexylsulfonyl peroxide, 2,4,4-trimethylpentyl 2-peroxyphenoxyacetate, 3,5,5-trimethylhexanoyl peroxide, lauryl peroxide, azobis-2,4-dimethylvaleronitrile, azobis(4-methoxy-2,4-dimethylvaleronitrile and a mixture thereof.

6. The process of claim 1, wherein said polymerization initiator further comprises a water-soluble catalyst selected from the group consisting of potassium persulfate, ammonium persulfate, hydrogen peroxide, cumene hydroperoxide and a mixture thereof.

* * * * *